United States Patent
Julemont et al.

(10) Patent No.: US 12,440,062 B2
(45) Date of Patent: Oct. 14, 2025

(54) COOKING DEVICE

(71) Applicant: BABYLISS FACO SRL, Wandre (BE)

(72) Inventors: Pierre Julemont, Wandre (BE); Alain Goering, Liège (BE); Aubry Ernotte, Theux (BE)

(73) Assignee: BABYLISS FACO SRL, Wandre (BE)

( * ) Notice: Subject to any disclaimer, the term of this patent is extended or adjusted under 35 U.S.C. 154(b) by 672 days.

(21) Appl. No.: 17/904,575

(22) PCT Filed: Jan. 19, 2021

(86) PCT No.: PCT/EP2021/051041
§ 371 (c)(1),
(2) Date: Aug. 18, 2022

(87) PCT Pub. No.: WO2021/164969
PCT Pub. Date: Aug. 26, 2021

(65) Prior Publication Data
US 2023/0092589 A1 Mar. 23, 2023

(30) Foreign Application Priority Data
Feb. 19, 2020 (EP) .................................... 20158211

(51) Int. Cl.
*A47J 37/06* (2006.01)
*F24C 7/06* (2006.01)

(52) U.S. Cl.
CPC ....... *A47J 37/0611* (2013.01); *A47J 37/0635* (2013.01); *F24C 7/067* (2013.01)

(58) Field of Classification Search
CPC ..... A47J 37/0611; A47J 37/0635; F24C 7/067
See application file for complete search history.

(56) References Cited

U.S. PATENT DOCUMENTS 3,811,375 A    5/1974  Fritzsche
2004/0217109 A1* 11/2004  Chang .................. A47J 37/0611
                                                    219/524

FOREIGN PATENT DOCUMENTS

DE   102014227046 A1   6/2016
EP        1400194 A1   3/2004
WO     2014076511 A1   5/2014

OTHER PUBLICATIONS

International Search Report and Written Opinion of the International Searching Authority from the European Patent Office, in PCT/EP2021/051041 dated Mar. 24, 2021, which is an international application corresponding to this U.S. application.

(Continued)

*Primary Examiner* — Robert G Bachner
(74) *Attorney, Agent, or Firm* — Kolitch Romano Dascenzo Gates LLC

(57) ABSTRACT

An electrical cooking device is disclosed, including a lower frame and an upper frame which are articulated about a pivot axis. The lower and upper frames each include:
  a removable cooking plate
  a heating resistor
  a peripheral heat reflection plate and
  a heat reflection plate for heat resistance
The upper frame has at least one insulating plate and the lower frame has a main drip port in the lower peripheral heat reflection plate. This main drip port is configured to discharge liquids generated, during use, into a receptacle located below the lower frame. The cooking plates are set back from the peripheral heat reflection plates.

8 Claims, 7 Drawing Sheets

(56) References Cited

OTHER PUBLICATIONS

European Search Report from the European Patent Office, pursuant to Rule 62 EPC, dated Aug. 17, 2020 in Patent Application No. 20158211.1, which is a foreign counterpart to this U.S. Application, to which this application claims priority.

* cited by examiner

COOKING DEVICE

INTRODUCTION

Cooking devices of the waffle iron or grill type are well known by those skilled in the art. They generally comprise two articulated parts each comprising a cooking plate as well as a heating resistor in contact with said plate. The two articulated parts are closed during cooking, facing one another, and the food is placed between them to be in contact with the two heating plates.

This type of device is for example described in document EP 1400194 A1. The cooking plates of this document have cavities able to receive food. An electrical resistor is arranged against each cooking plate, on the other side of the face including the cavities. A heat reflecting plate encloses each electrical resistor so as to form a housing receiving the latter, and allowing reflection of the heat emitted by the resistor toward the cooking plates.

Nowadays, the conditions for approval of such devices are increasingly strict. The outer walls of the device cannot exceed a certain temperature threshold so as to prevent the user from being burned. The improved insulation of the apparatus allows a more uniform cooking temperature to be obtained, avoiding local peaks of temperature. Furthermore, a new regulation also requires these devices to pass a temperature test in addition to the pre-existing spillage test. The spillage test consists in filling the cavities of the cooking plate to 115% capacity and analyzing whether the device is capable of discharging the excess liquid/paste without the latter overflowing uncontrollably between the two articulated parts of the apparatus.

Devices already exist for collecting cooking juices in the context of grills, but this is not the case for cooking apparatuses of the waffle iron or sandwich maker type.

Document US20040217109 describes an electrical cooking device comprising two articulated parts. Each part is formed by a hollow shell on which a cooking plate is removably fastened. A heating element is housed in the space formed between the shell and the cooking plate. A heat reflecting plate is provided below the heating element, that is to say, between the latter and the bottom of the shell so as to decrease the heat losses toward the outside of the apparatus. The particularity of this cooking device is that the cooking plate of one of the articulated parts is provided with a central opening, which allows the cooking juice to be discharged through this opening and fall onto the reflecting plate. The latter in turn comprises an outlet opening for discharging the juice from the apparatus into a removable receptacle provided in the shell.

Document WO2014/076511 discloses a toaster or a sandwich maker on which a heating element, a grilling plate and an external cover are assembled. The external cover is mounted on a basic group in areas of low temperature of the outer reflector with, as a result, peaks of temperatures on the external cover that are lower when the heating element radiates.

SUMMARY

The present disclosure relates to an electrical cooking device, such as a waffle iron or grill, in which food is cooked by contact with two lower and upper heating plates. The present disclosure relates in particular to a cooking device provided with a specific discharge means in case of spilled liquids or paste.

The cooking apparatuses of the state of the art are not provided with discharge devices allowing large quantities of liquids to be handled. Indeed, nowadays, the collection devices allow collection of the cooking juice under theoretical operating conditions, but do not guarantee satisfactory protection according to the new standards. They do not prevent the juices from flowing outside the apparatus between the two cooking plates.

The present disclosure is aimed at overcoming the drawbacks of the state of the art. In particular, it is aimed at providing an electrical cooking apparatus provided with a liquid collection device in case of overflow, so as to avoid damaging the apparatus.

The present disclosure also allows improved heat performance of the apparatus by improving the insulation of the shell.

The present disclosure discloses an electrical cooking device comprising a lower housing and an upper housing articulated about a pivot axis, said lower and upper housings each comprising:
 a removable cooking plate;
 a heating resistor;
 a peripheral heat reflecting plate;
 a heat reflecting plate for a heating resistor;
 the upper housing comprising at least one insulating plate and in that the lower housing comprising a main drip opening in the lower heat reflecting plate allowing the discharge of the produced liquids, in use, toward a receptacle located below the lower housing, the cooking plates being set back relative to the peripheral reflecting plate.

The disclosure comprises at least one or an appropriate combination of the following features:
 the heat reflecting plate for the heating resistor of the lower housing comprises a secondary drip opening allowing the discharge of the produced liquids, in use, toward the main drip opening;
 the main drip opening is located in a recess forming a low level in the lower peripheral heat reflecting plate;
 the secondary drip opening is located above the main drip opening;
 the lower cooking plate comprises a gutter allowing the cooking juices to be discharged outside the device and the receptacle protrudes past the lower housing so as to collect the cooking juices discharged by said gutter;
 the receptacle is removable;
 the cooking plates are set back relative to the peripheral reflecting plate, with the exception of the gutter;
 the receptacle is located at the rear of the device, below the lower housing;
 a support structure allows the receptacle to be held below the lower housing;
 the cooking plates comprise cavities able to receive food.

NUMERICAL REFERENCES OF THE FIGS

Figure 1:
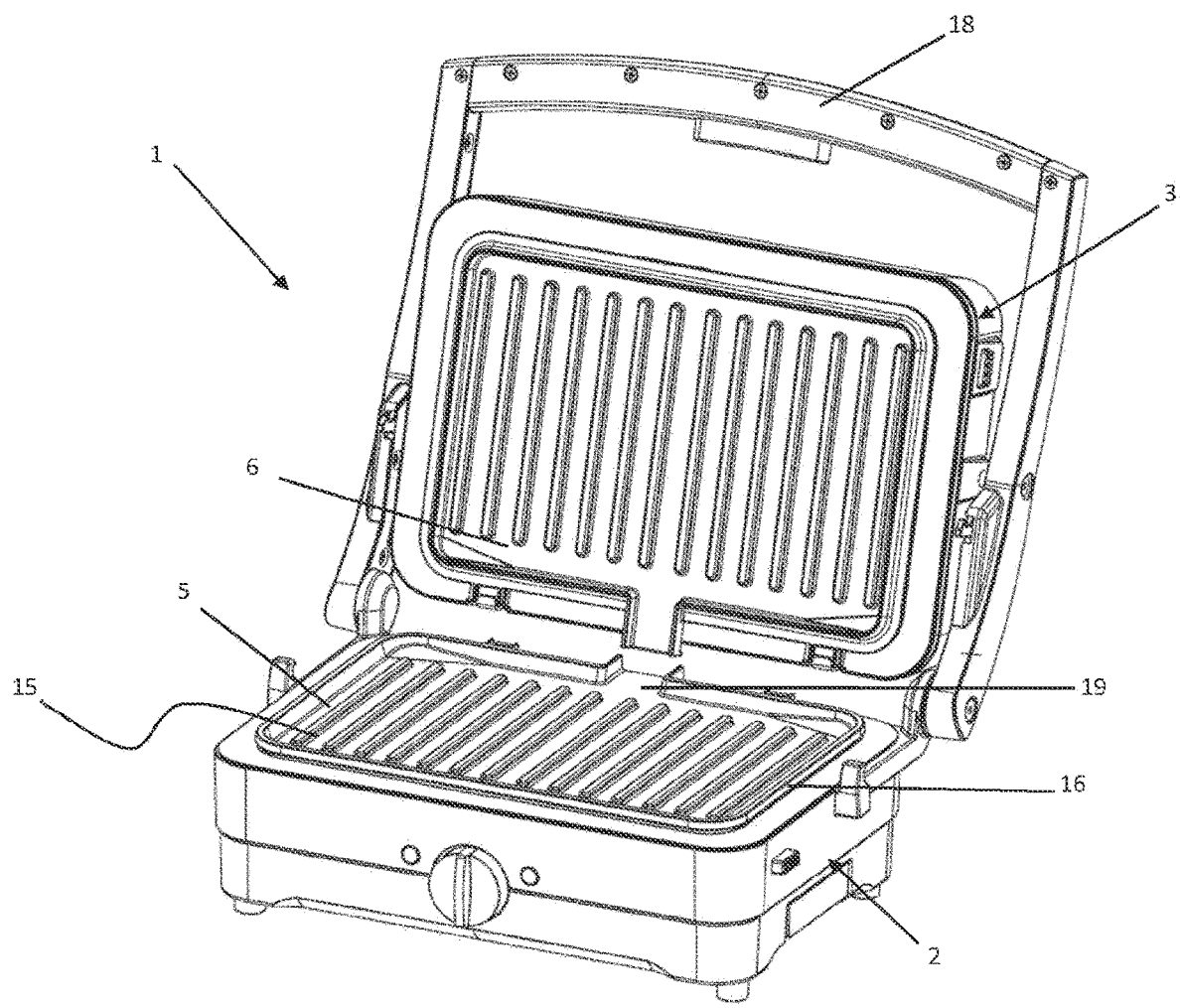
FIG. 1 shows an example of an electrical cooking device according to the present disclosure in the open position and comprising cooking plates with cavities of the "grill" type.

1: electrical cooking device
2: lower hollow housing of the cooking device
3: upper hollow housing of the cooking device
4: receptacle for receiving liquids
5: lower removable cooking plate
6: upper removable cooking plate
7: heating resistor
8: lower peripheral heat reflecting plate
9: upper peripheral heat reflecting plate
10: heat reflecting plate for the lower resistor
11: heat reflecting plate for the upper resistor
12: main drip opening
13: secondary drip opening
14: insulating plate
15: cooking plate cavity
16: outer edges of the cooking plate
17: recess in the lower peripheral heat reflecting plate
18: handle
19: gutter

DETAILED DESCRIPTION

Figure 2:
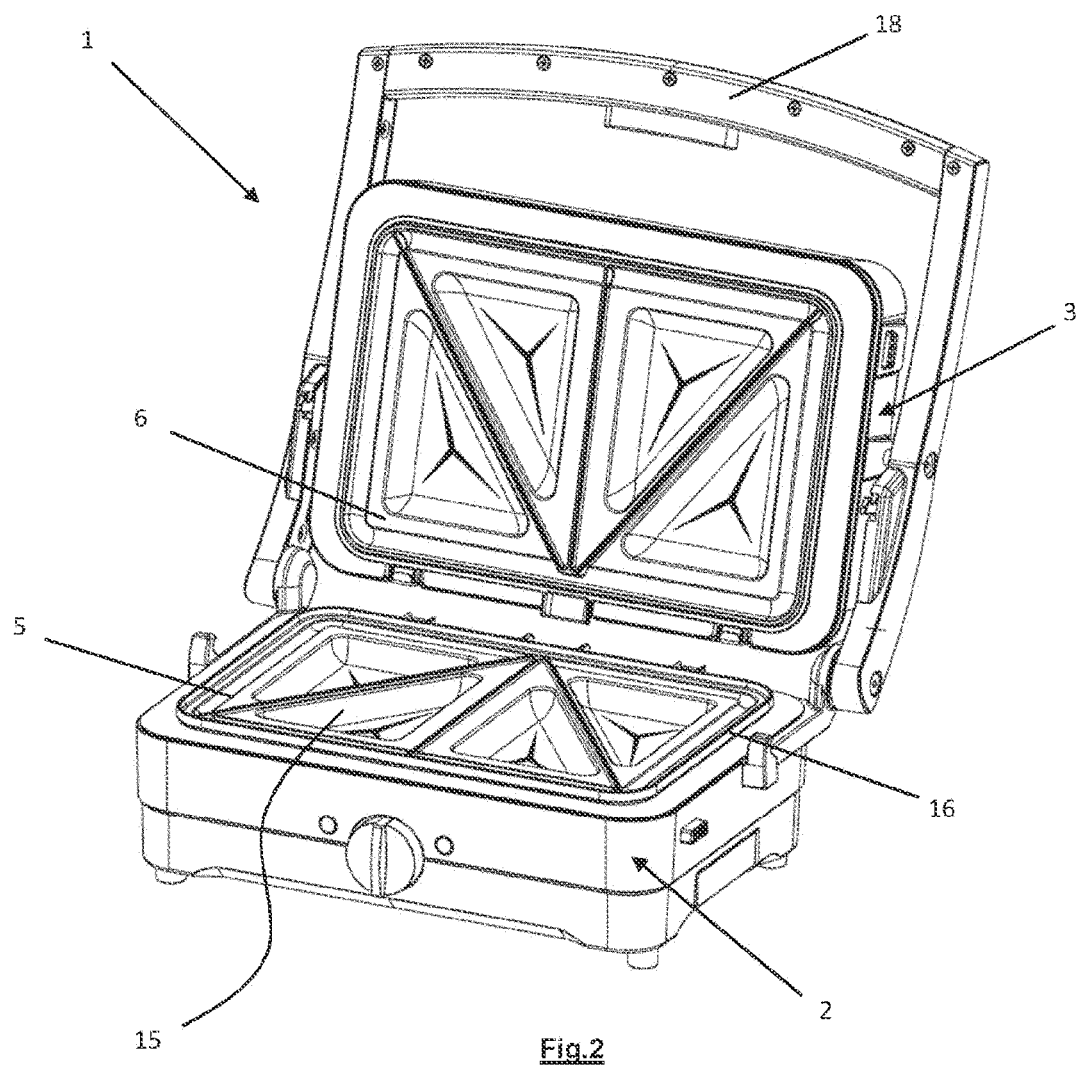
FIG. 2 shows an example of an electrical cooking device according to the present disclosure in the open position and comprising cooking plates with cavities of the "sandwich maker/waffle iron" type.
Figure 7:
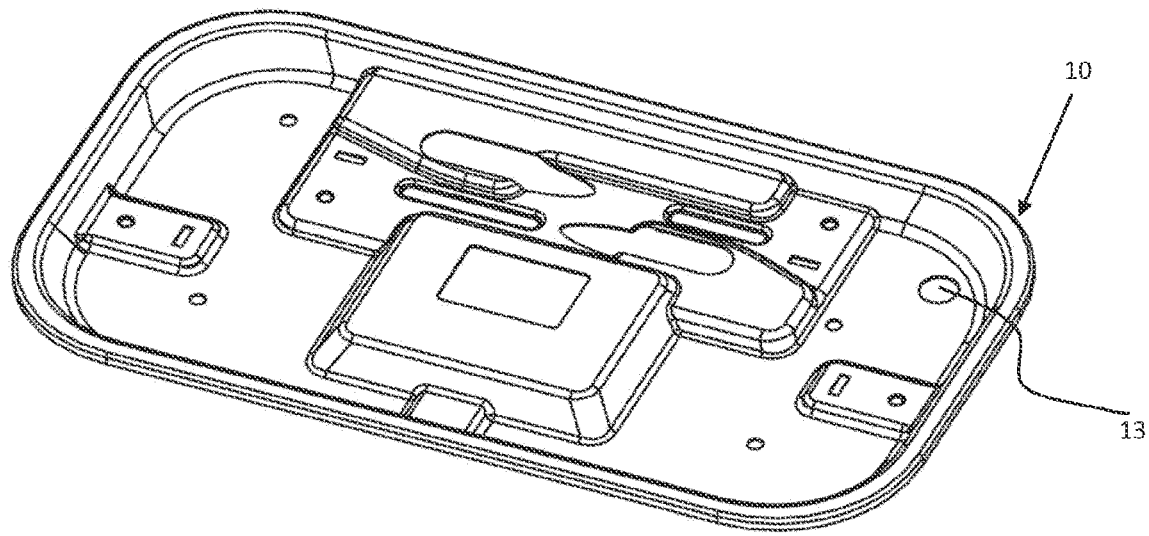
FIG. 7 shows the second heat reflecting plate of the cooking device according to the present disclosure.
Figure 8:
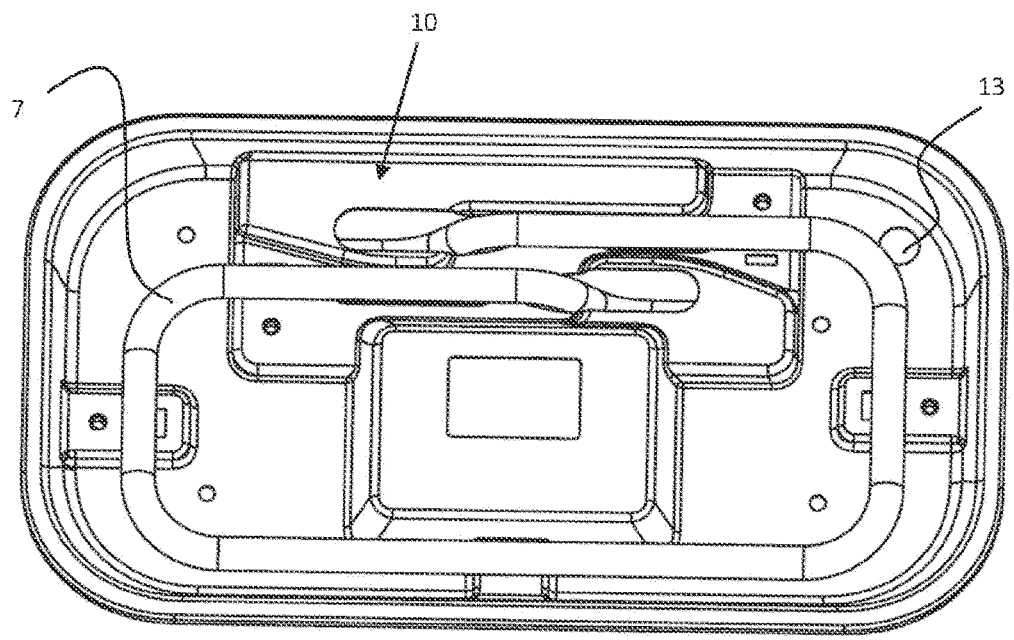
FIG. 8 shows the second heat reflecting plate of the cooking device according to the present disclosure, with the heating resistor.
Figure 9:
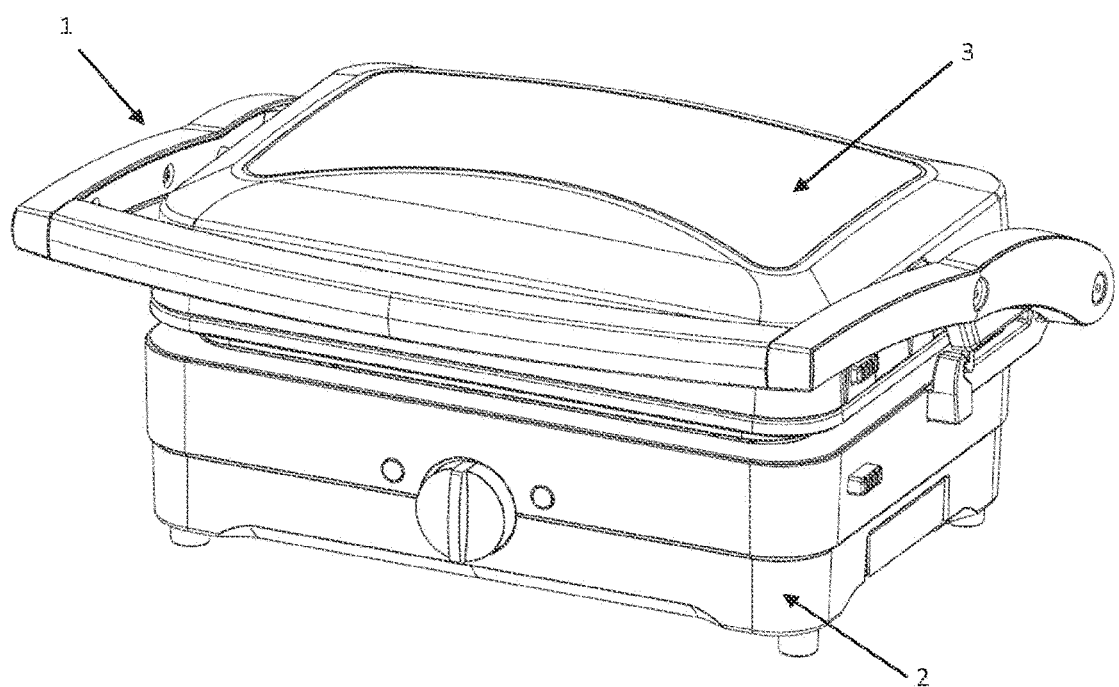
FIGS. 9 and 10 show two perspective views of an example of the cooking device according to the present disclosure, the latter being in the closed position.
Figure 10:
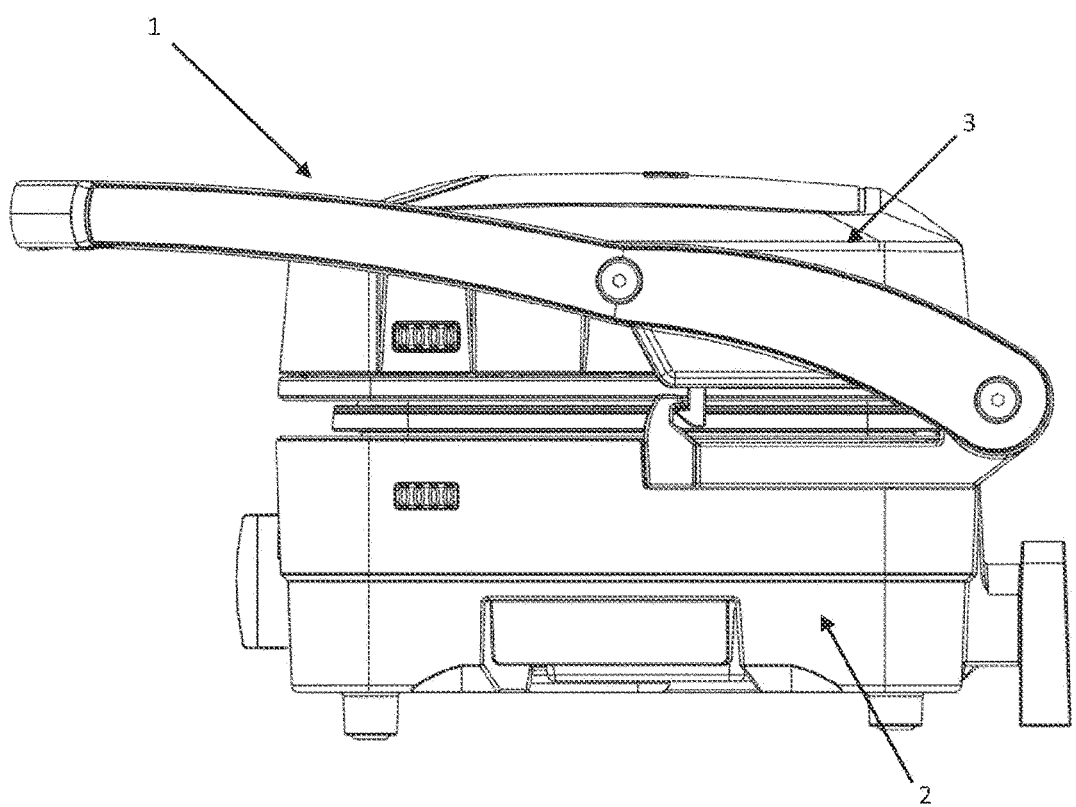

The present disclosure discloses an electrical cooking device 1, of the waffle iron or grill type, comprising two articulated outer housings 2 and 3 as shown in FIGS. 1 and 2. The two housings are hollow so as to form the outer enclosure of the device. As illustrated in FIG. 7, each housing cooperates with a removable cooking plate 5 and 6 and accommodates a heating resistor 7. During cooking, the two articulated parts are closed to face one another, the food being placed between them to be in contact with the two heating plates.

In the present description, the terms "lower" and "upper" describe the elements relative to the lower and upper parts, respectively, of the apparatus with respect to its position on a worktop.

Figure 3:
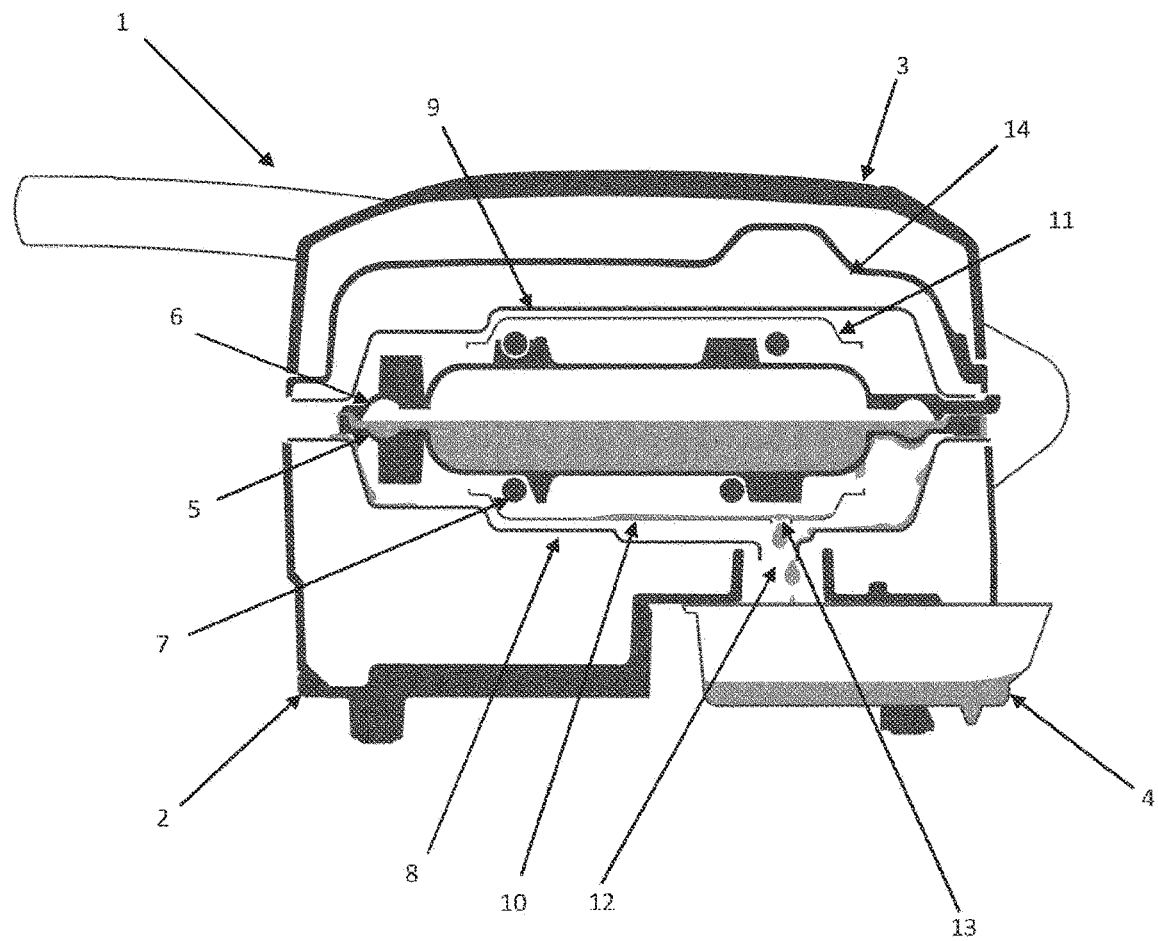
FIG. 3 shows a cross section of an example of a cooking device according to the present disclosure in the closed position. The cooking plates are of the "sandwich maker/waffle iron" type in this figure.
Figure 4:
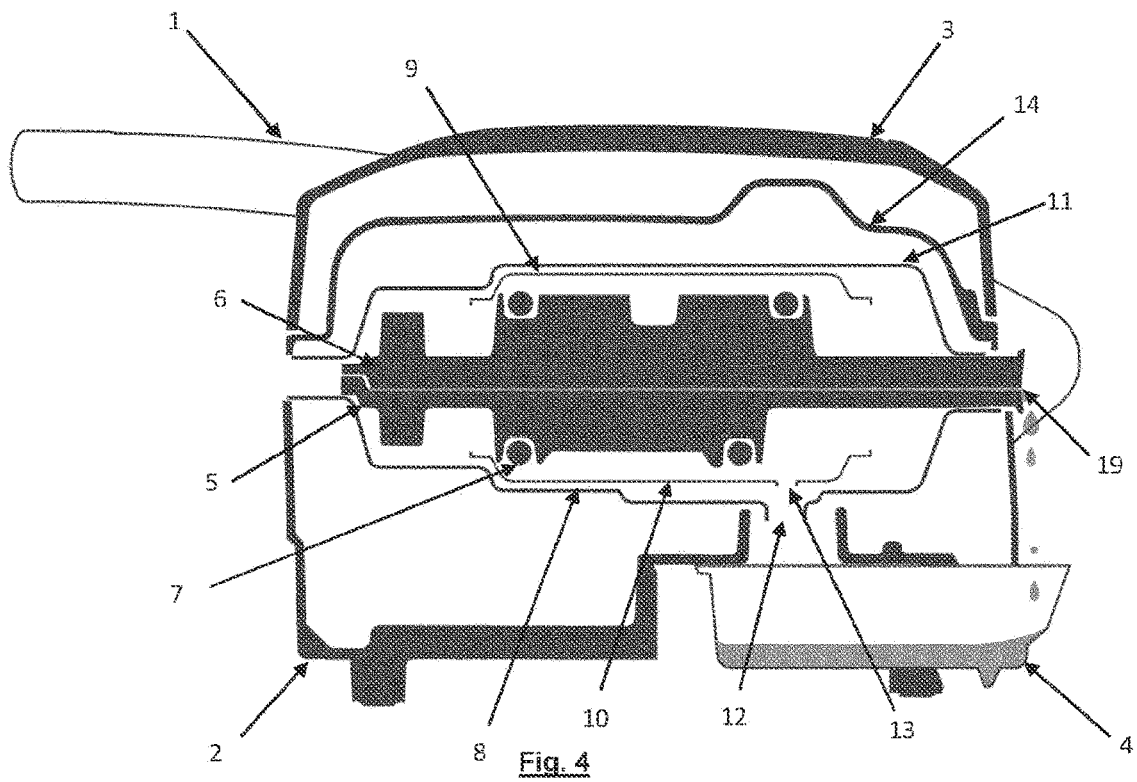
FIG. 4 shows a cross section of an example of a cooking device according to the present disclosure, in the closed position. In this example, the cooking plates are of the "grill" type.
Figure 5:
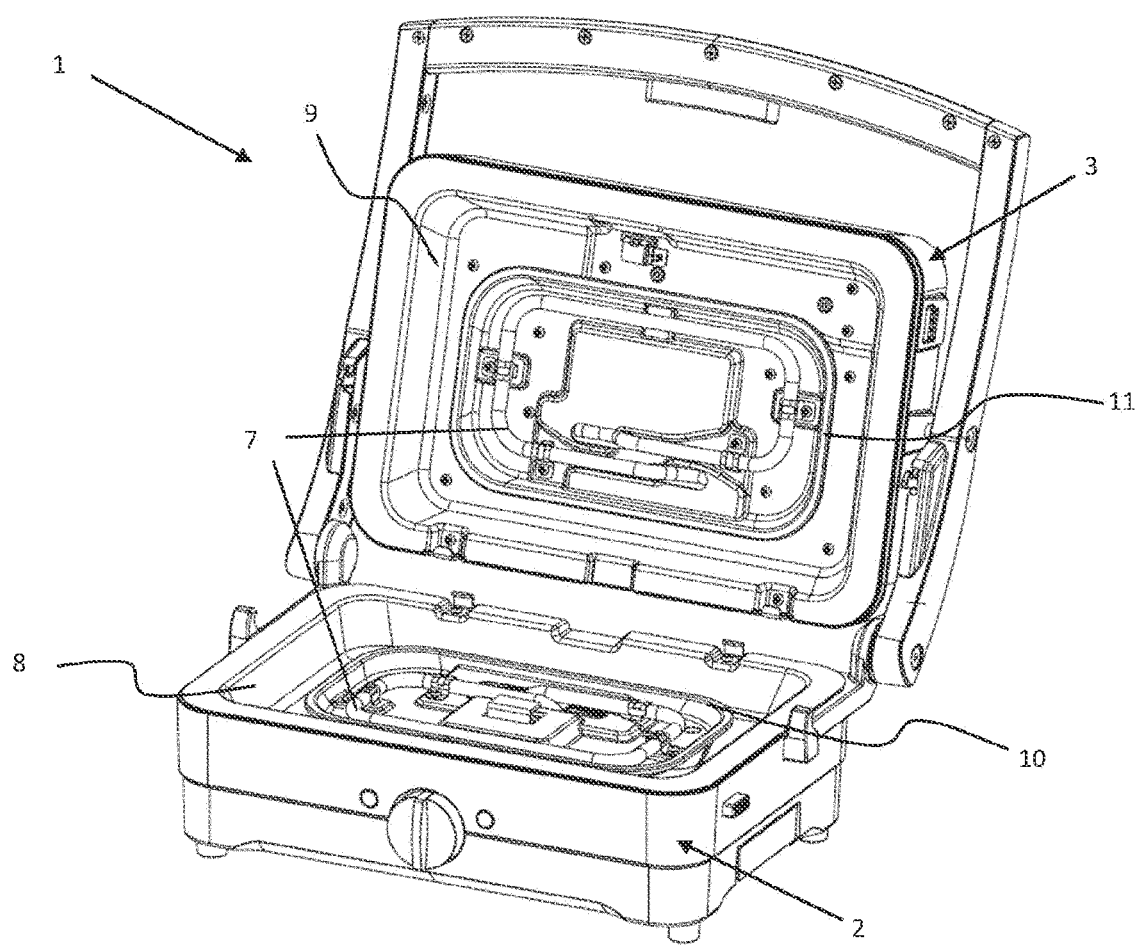
FIG. 5 shows an example of an electrical cooking device according to the present disclosure, in the open position and with no removable cooking plates.
Figure 6:
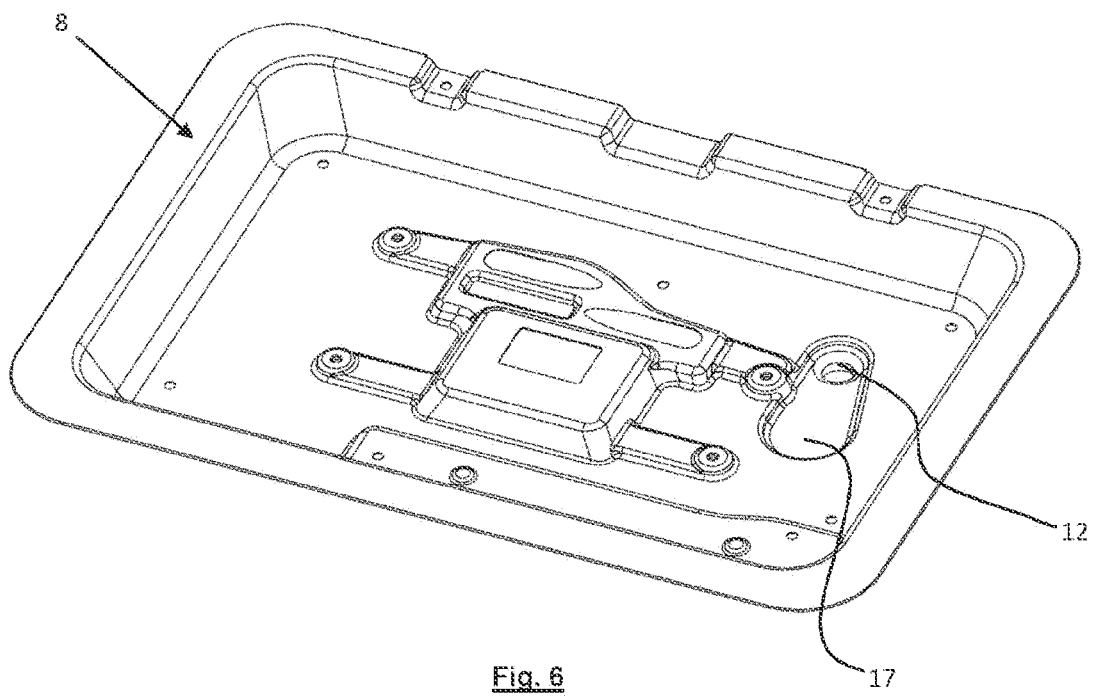
FIG. 6 shows the first heat reflecting plate of the cooking device according to the present disclosure.

As shown in FIGS. 3 and 4, peripheral heat reflecting plates 8 and 9 are provided inside each outer housing. This makes it possible to decrease the heat energy losses toward the outside of the apparatus and to reflect the heat emitted by the heating resistor toward the cooking plates.

A main drip opening 12 is provided in the lower peripheral heat reflecting plate 8. This opening is preferably located in a recess 17 forming a low level in the peripheral reflecting plate. When liquids overflow from the cooking plates, they can infiltrate between the lower cooking plate and the lower peripheral reflecting plate, as illustrated in FIG. 3. The liquids then flow by gravity toward this main drip opening. A receptacle 4 is located below the housing, below the drip opening so as to collect the liquids. This receptacle can be removable to be emptied.

A heat reflecting plate for the resistors 10 and 11 is also provided inside each outer housing, between the peripheral heat reflecting plate and the removable cooking plate. It is intended to protect the electrical elements from the flow of the liquids in the lower peripheral reflecting plate, by being placed higher than the lower peripheral reflecting plate. Furthermore, the outer edges of the reflecting plate for the resistors are preferably set back relative to the outer edges of the cooking plate, preferably allowing the liquids to directly reach the bottom of the peripheral heat reflecting plate. When liquids overflow from the cooking plate, they infiltrate between the cooking plate and the outer housing and fall into the peripheral heat reflecting plate 8. Since the reflecting plate of the heat resistor is set back, the risk of liquids falling therein is low and the resistors are protected from this flow, as are the attachment systems and other cables. If, however, as illustrated in FIGS. 3 and 4, the liquids were to reach the reflecting plate of the resistors 10, the latter comprises a secondary drip opening 13 for discharging the liquids toward the receptacle 4, via the main drip opening 12. Preferably, the secondary drip opening is vertically aligned with the main drip opening.

Preferably, the lower cooking plate 5 comprises a gutter 19 allowing the cooking juices to be also discharged outside the device (see FIGS. 1 and 4). This is preferably the case when the cooking plates are of the "grill" type. The cooking juices are discharged outside the apparatus, and are collected in the receptacle 4, which, in this case, protrudes past the lower housing 2 so as to collect the juices discharged by the gutter. In this embodiment, the cooking juices can follow three different paths before being collected by the receptacle. The cooking plates 5 and 6 of the cooking device are therefore set back relative to the peripheral reflecting plates 8 and 9, with the exception of the gutter to allow the discharge of the cooking juices.

Preferably, the outer edges of the reflecting plate for the resistor 10 rise up so as to form lateral walls surrounding the electrical elements, like a basin, to protect them more effectively from the liquids present in the lower peripheral reflecting plate.

The cooking device of the present disclosure also comprises a thermal insulation system to decrease the heat losses to the outside of the apparatus and to homogenize the heating temperature within the apparatus. The outer walls of the device, once closed and in use, should not exceed 90° C. for the weakly conductive surfaces and for plastic materials, and 70° C. for metals, when the cooking plates are heated at a temperature from 220 to maximum 240° C. This makes it possible to prevent the user from being burned. As shown in FIGS. 3 and 4, the upper housing of the device comprises at least one insulating plate 14.

In one advantageous embodiment of the disclosure, the cooking plates have cavities 15 able to receive food. The latter can be of the "grill" type as illustrated in FIG. 1, of the "sandwich maker" type as illustrated in FIG. 2, or of any other type of shape.

Furthermore, the heating resistors of each articulated part 2 and 3 can be heated independently of one another.

The invention claimed is:

1. An electrical cooking device comprising a lower housing and an upper housing articulated about a pivot axis, the lower and upper housings each comprising:
   a removable cooking plate;

a heating resistor;
a peripheral heat reflecting plate; and
a heat reflecting plate for the heating resistor;
the upper housing comprising at least one insulating plate and the lower housing comprising a main drip opening in the lower peripheral heat reflecting plate configured to allow discharge of produced liquids, in use, toward a receptacle located below the lower housing, wherein the removable cooking plates of the cooking device are set back relative to the peripheral heat reflecting plate.

2. The cooking device according to claim 1, wherein the heat reflecting plate for the heating resistor of the lower housing comprises a secondary drip opening allowing discharge of the produced liquids, in use, toward the main drip opening.

3. The cooking device according to claim 1, wherein the main drip opening is located in a recess forming a low level in the lower peripheral heat reflecting plate.

4. The cooking device according to claim 1, wherein the lower cooking plate comprises a gutter configured to allow the produced liquids to be discharged outside the device and wherein the receptacle protrudes past the lower housing so as to collect the liquids discharged by the gutter.

5. The cooking device according to claim 1, wherein the receptacle is removable.

6. The cooking device according to claim 1, wherein the receptacle is located at a rear of the device, below the lower housing.

7. The cooking device according to claim 1, wherein a support structure is configured to allow the receptacle to be held below the lower housing.

8. The cooking device according to claim 1, wherein the cooking plates comprise cavities configured to receive food.

* * * * *